US00RE40688E

(19) United States
(12) Reissued Patent
Green

(10) Patent Number: US RE40,688 E
(45) Date of Reissued Patent: Mar. 31, 2009

(54) SYSTEM FOR PRODUCING PERSONALIZED VIDEO RECORDINGS

(75) Inventor: David Green, Ramat Beit Shemesh (IL)

(73) Assignee: Karlgar Limited, Tortola (VG)

(21) Appl. No.: 10/006,971
(22) Filed: Dec. 6, 2001

Related U.S. Patent Documents

Reissue of:
(64) Patent No.: 6,072,933
Issued: Jun. 6, 2000
Appl. No.: 08/807,532
Filed: Feb. 28, 1997

U.S. Applications:
(63) Continuation-in-part of application No. 08/399,013, filed on Mar. 6, 1995, now abandoned.

(51) Int. Cl.
*H04N 5/91* (2006.01)

(52) U.S. Cl. ..... 386/46; 386/95; 386/E5.034; 386/E5.069

(58) Field of Classification Search ..... 386/1, 386/4, 38, 39, 45, 46, 52, 53–64, 117, 95; 348/578, 584, 585, 586, 587, 588, 589, 590–592; *H04N 5/76, 5/92, 9/74, 9/75*
See application file for complete search history.

(56) References Cited

U.S. PATENT DOCUMENTS

| | | | | | |
|---|---|---|---|---|---|
| 4,688,105 | A | | 8/1987 | Block et al. | 386/55 |
| 4,947,256 | A | | 8/1990 | Wood et al. | 358/183 |
| 4,987,552 | A | | 1/1991 | Nakamura | 364/521 |
| 5,016,113 | A | | 5/1991 | Yamashita et al. | 358/335 |
| 5,077,610 | A | | 12/1991 | Searby et al. | 358/183 |
| 5,099,337 | A | | 3/1992 | Cury | 386/54 |
| 5,151,793 | A | | 9/1992 | Ito et al. | 386/98 |
| 5,264,933 | A | | 11/1993 | Rosser et al. | 358/183 |
| 5,416,529 | A | * | 5/1995 | Lake | 348/590 |
| 5,434,678 | A | | 7/1995 | Abecassis | 358/342 |
| 5,566,251 | A | | 10/1996 | Hanna et al. | 348/589 |
| 5,625,461 | A | * | 4/1997 | Okamoto et al. | 386/53 |
| 5,625,570 | A | | 4/1997 | Vizireanu et al. | 364/514 |
| 5,655,053 | A | | 8/1997 | Renie | 386/117 |
| 5,703,995 | A | | 12/1997 | Willbanks | 386/52 |
| 5,872,887 | A | | 2/1999 | Walker | 386/117 |
| 5,923,791 | A | * | 7/1999 | Hanna et al. | 382/295 |
| 6,061,532 | A | | 5/2000 | Bell | 396/661 |
| 6,072,537 | A | | 6/2000 | Gurner et al. | 348/586 |

OTHER PUBLICATIONS

Ultimatte Basics—faq's [online]. Ultimatte website [retrieved on Jun. 5, 2001]. Retrieved from the Internet: <URL: http://www.ultimatte.com/basics.html>. (6 pages).

Ultimatte According to Bob [online]. Bluescreen According to Bob Kertesz, Jan. 28, 1995 [retrieved on Jun. 1, 2001]. Retrieved from the Internet: <URL:http://www.gregssandbox.com/bs/kertesz.htm>. ( 3 pages).

Mitsunaga, Tomoo, et al., "AutoKey: Human Assisted Key Extraction," Computer Graphics Proceedings, Annual Conference Series, SIGGRAPH 95 Conference Proceedings, ACM SIGGRAPH, Aug. 6–11, 1995, Los Angeles, CA, pp. 265–272.

* cited by examiner

*Primary Examiner*—Thai Tran
*Assistant Examiner*—Mishawn Dunn
(74) *Attorney, Agent, or Firm*—Fenwick & West LLP

(57) ABSTRACT

A system for the production of video signals includes a playback device for playing back prerecorded video and audio signals from a prerecorded storage medium, a source of user supplied video and audio signals, a video and audio mixer for combining the prerecorded and user supplied signals to provide combined video and audio outputs, a production monitor connected to the mixer to display to the user the mixed signals, and a storage or reproduction device receiving a mixed video signal output from the mixer. The prerecorded storage medium, wherein the prerecorded storage medium stores, as well as a video channel and at least one audio channel, at least one prompting channel, the video signals stored on the prerecorded medium being prekeyed to indicate areas to be overlaid in the mixer by the user supplied video signals, and the mixer being operative to convert signals from the prompting channel into production control signals.

146 Claims, 3 Drawing Sheets

SYSTEM FOR PRODUCING PERSONALIZED VIDEO RECORDINGS

Matter enclosed in heavy brackets [ ] appears in the original patent but forms no part of this reissue specification; matter printed in italics indicates the additions made by reissue.

RELATED APPLICATION

This application is a continuation-in-part of my application Ser. No. 08/399,013, filed Mar. 6, 1995, now abandoned.

FIELD OF THE INVENTION

This invention relates to the production of video sequences, in which users own video signal can be combined with a prerecorded video signal to provide a composite sequence, in which prerecorded images are integrated with the user's own material.

REVIEW OF THE ART

So called video karaoke systems are well known in which a video recording is provided, with the video display overlaid by text indicating the words of a song, usually with some form of marker to indicate the synchronization of the words of the song with a musical accompaniment recorded on the sound channel or channels of the video recording. This enables persons viewing the recording to "sing along" with the musical accompaniment.

It is also well known to produce composite video signals by overlaying one signal on another, utilizing one of several keying techniques of which those known as chroma-keying and luminance keying are the most common. In chroma-keying, essential elements of a foreground scene, typically a person or persons, are imaged against a background having a higher level of saturation of a particular colour than is likely to occur in the foreground objects. Typically an intense blue background is utilized, but other colours may be used provided that, in the particular application, they enable the foreground and background to be reliably differentiated by signal processing circuitry. An alternative approach is known as luminance keying, in which it is arranged that the luminance level of the background against which the foreground objects are imaged is consistently and detectably lower than that of the wanted foreground objects. During the combination process, boundaries between the foreground objects and the background are detected on the basis of the above-mentioned difference in colour content or luminance level, so as to produce a switching signal which switches a second video signal, synchronized with the first, into the background areas. These techniques are well known and understood in the art, but require good quality and hence expensive equipment to operate reliably.

In U.S. Pat. No. 5,099,337 (Cury) it is proposed to provide a selection of background audio and video recordings which can be selected from separate libraries and combined with foreground audio and video signals provided by a user, so as to enable the user to provide customized video recordings in which the users own foreground images and audio signals are superimposed upon selected background audio and video signals. This in effect provides system in which the user, as well as providing a foreground audio signal, also provides a foreground video signal, and is provided with means for recording the result. A performer performs in front of a blue screen, so that the performer's image may be chromakeyed into the background video signal, thus providing the illusion that the performer is performing in the selected background. During performance, prompt information is provided to a performer through a prompt monitor from a prerecorded prompt library.

A limitation of such systems is that, by their nature, they can only provide background for a user's performance, and may require the user,s signal to be keyed which, as mentioned above, may be difficult to achieve reliably with consumer quality equipment.

SUMMARY OF THE INVENTION

In its broadest aspect, the present invention relates to a system in which a prerecorded video signal is prekeyed to define background areas which, on playback by a user of a recording medium carrying the keyed signal on apparatus configured to recognize the prekeyed background areas, will generate a signal into which may be inserted, in those background areas, a local signal provided by the user, which need not itself by keyed.

The present invention further seeks to provide a system in which a keyed video prerecording is used to provide a prerecorded signal which is combined with a user provided background signal to provide a final combined signal, the prerecording including prompt channel, which can be suppressed in the final combined signal, to assist a user and/or a user's equipment to provide a background signal compatible with the prerecorded signal.

According to the invention, there is provided a system for the production of video signals, comprising a playback device for playing back prerecorded video and audio signals from a prerecorded storage medium, a source of user supplied video and audio signals, a video and audio mixer for combining the prerecorded and user supplied signal to provide combined video and audio outputs, a production monitor connected to the mixer to display to the user the mixed signals, and a storage or reproduction device receiving a mixed video signal output from the mixer, wherein the prerecorded storage medium stores, as well as a video channel and at least one audio channel, at least one prompting channel, the video signals stored on the prerecorded medium being prekeyed to indicate areas to be overlaid in the mixer by the user supplied video signals, and the mixer being operative to convert signals from the prompting channel into production control signals. Typically the production control signals include prompts displayed on the production monitor but absent from the combined video output.

The invention extends to a recording medium providing multiple channels of information, including a video channel, a least one audio channel, and at least one prompting channel, the video channel being recorded with a video signal prekeyed to indicate picture areas available for overlay by a user provided video signal, and the prompting channel including data translatable into instructions for control of the user provided video signal.

In order to permit production of prerecorded tapes (or discs or other media) which will perform reliably with low cost user equipment, I employ by preference a modified luminance keying system in producing the prerecorded tapes. In simple terms, the brightness level of at lease the lowlights of portions of images which are not to be overlaid by the user signal is artificially enhanced so that the "black level" of retained image portions is well above the normal black level of a recorded signal, thus enabling the keyed portion which is at or below the normal black level, to be readily distinguished. The user supplied signals are also brightness enhanced in a similar manner prior to mixing with the signal from the prerecorded tape, and the brightness level of the mixed signal is then returned to normal so as to restore the original black levels.

The word "video signal" as used in this specification, means a television type video signal consisting of a sequence of frames which when reproduced in radial succession are capable of providing a moving picture. It does not include bit-mapped or vector digital representations of a single static image.

SHORT DESCRIPTION OF THE DRAWINGS

DESCRIPTION OF THE PREFERRED EMBODIMENT

Figure 1:
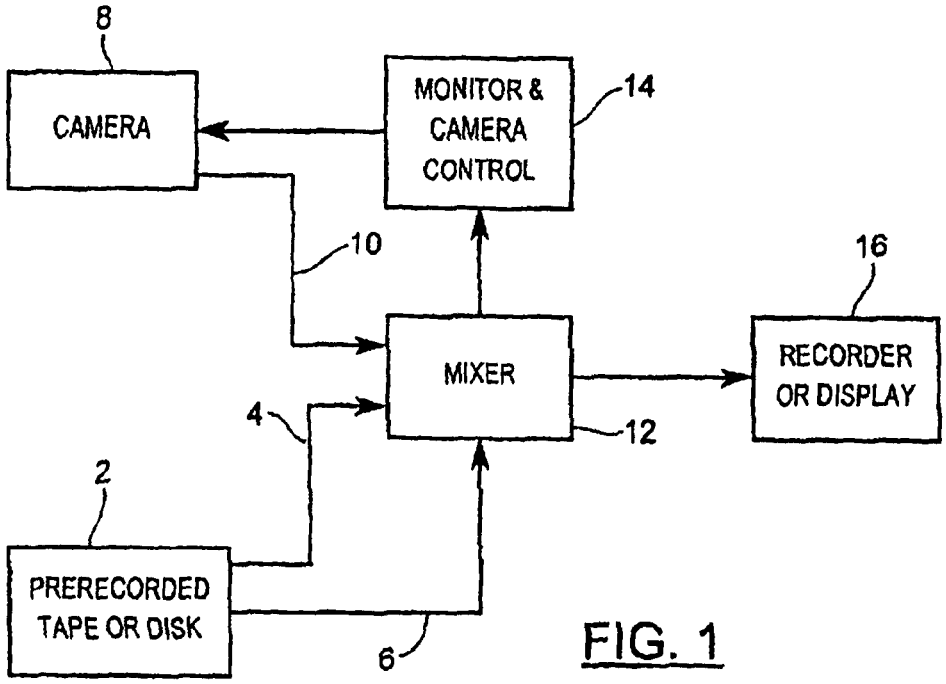
FIG. 1 is a simplified block diagram of the system.

Referring to FIG. 1, which has been simplified by omitting any consideration of sound as opposed to video channels, a prerecorded tape or video disk, generically referred to as a prerecording 2, is replayed to provide a foreground video signal upon which a user signal may be overlaid using chroma or luminance keying or any other system enabling effective identification of areas of the recorded image available for overlay by a user signal (henceforward generically referred to as "keying") It should be understood that the keying signal, whatever form it takes, for example a high saturation of blue, or a very low luminance level, is already built into the prerecording 2 so as to predefine those areas of the prerecorded signal 4 available for overlay by user provided video signals: the user provided signals will not usually themselves be keyed, and if they are keyed, it will be for purposes extraneous to the present invention. It should also be understood that overlay effects depend on successive fields of the prerecorded video being keyed in certain areas, fields may also be either wholly keyed or not keyed at all, thus permitting scenes provided wholly either by the user or wholly by the prerecorded tape. The prerecorded tape also preferably carries, as well the video signal channel, at least one audio channel for audio signals, and at least one prompting channel 6 for prompting signals prompting of instructing the user and/or the users equipment so as to assist in rendering the content of the user provided signal compatible with the foreground content of the prerecording. Prompts to the user may include text prompts, e.g. the words of a song and/or stage directions, or position of dimension indicators to assist the user in controlling direction or zooming of a video camera providing the user signal. It should further be understood that the playback of the prerecording may occur at a remote point, with the signal being distributed to users over a distribution network such as a CATV network or the internet.

A controllable user video source, usually a camera 8 (or one of multiple selectable cameras) has a signal output to a mixer 12 which combines the video signals by inserting the user signal output 10 in those areas of the prerecorded signal 4 which are identified by the keying, or by mixing the user signal with the prerecorded signal, depending upon the effect desired. The superimposition provided by mixing may be useful for some applications for example training videos. The prompting signals on channel 6 are translated by the mixer 12 into signals displayed on a user monitor 14 so that a user may control the camera 8, or sing (or otherwise perform) along with a prerecorded artist; or the user monitor may implement a camera control function (for example a power zoom control) which is applied directly to the camera to control its input to the mixer 12, which replaces the keyed portions of the signal from the prerecording 2 with the signal 10 from the camera 8. It is however preferred that zooming be performed electronically within the mixer, because of the lack of standardization of camera controls. The signals 4 and 10 must of course be synchronized to a common set of scanning signals before combination. This is preferably achieved as discussed below with reference to FIG. 3, but in an alternative arrangement the camera 8 receives a signal via control 14 which synchronizes it to the signal 6 from the prerecorded source. The output signal from the mixer 12 is passed to a suitable recorder and/or display 16.

Figure 2:
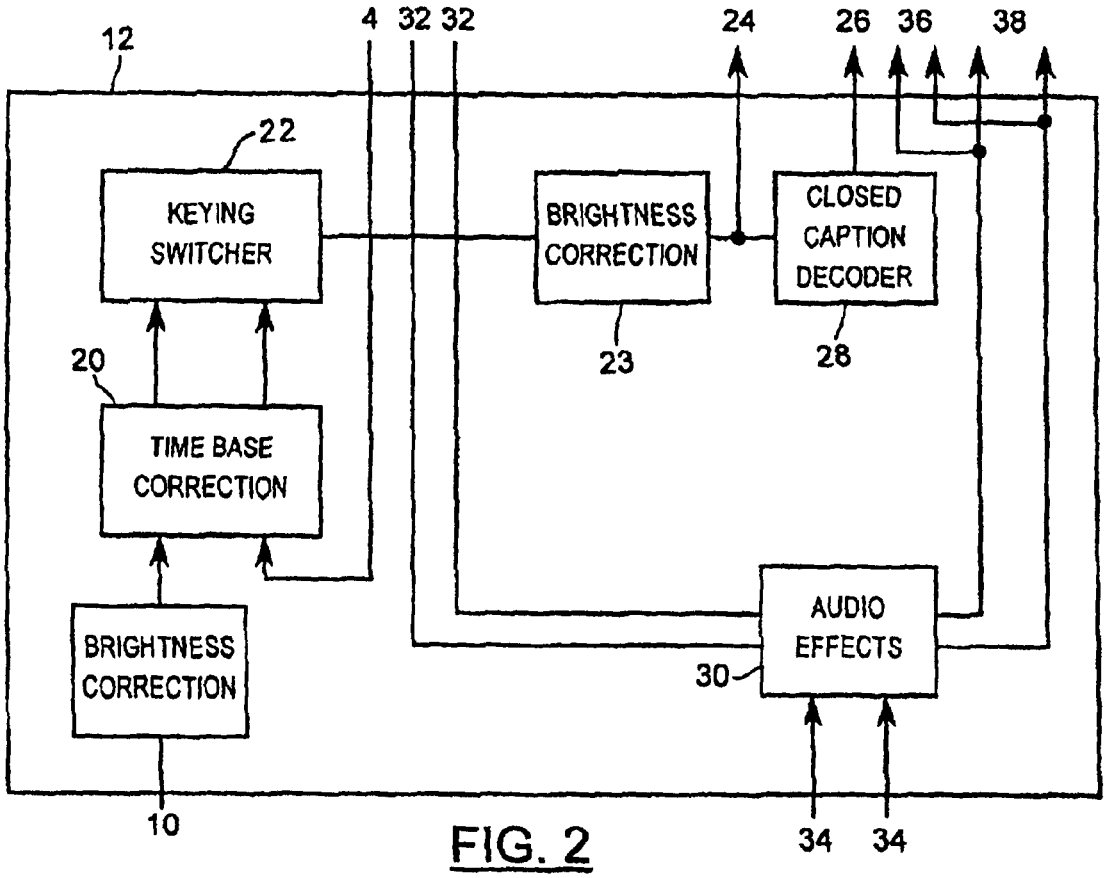
FIG. 2 is a simplified block diagram of a mixer unit used in the system.

Referring now to FIG. 2, this shows schematically one embodiment of the mixer 12 in somewhat more detail. Video inputs 4 (including the signal 6) and 10 are applied to a timebase control unit 20 which ensures synchronization between the video signals, preferably by applying them to synchronized frame memories as described below, since this requires no feedback control of the timing of either input signal. A brightness enhancement circuit 21 may be provided in one advantageous embodiment of the invention to enhance the brightness of the lowlights of the user supplied video signal so that its black levels are well above the pedestal level of the video signal by an amount equal to a similar brightness boost already present in unkeyed image areas of the prerecorded video signal in unkeyed areas, keyed areas being maintained at of slightly below normal black level. This distortion of the prerecorded video signal enables the keying switcher to detect keyed areas very simply and reliably since there will be a substantial minimum difference of the level of the video signal in keyed and unkeyed areas which can readily be detected even in the presence of some distortion of the video signal. Typically, this enhancement may be about 20% or more the normal difference between black and white levels of the signal. The brightness enhancement applied to the user signal by the circuit 21 should of course be substantially the same as that applied during manufacture of the tape providing the signal 4. Downstream of the switcher 22, a further brightness control circuit 23 applies an equal and opposite correction to restore proper brightness levels in the signal. A level switching circuit 22 responds to the keying signal extracted from the signal 4 to switch between levels of the signals 4 and 10 and thus provide a combined video output signal 24 to the recorder and/or display 16 (FIG. 1). For full keying the different levels of the two signals are full/zero and zero/full respectively, but other level combinations can be utilized with suitable digital mixing technology, in a manner known per se. The video output signal is also applied, in this embodiment, to a closed caption decoder 28 which extracts control signals and which are encoded into an available channel in the prerecording 2, in this case that portion of the video interval between frames normally reserved for closed captioning. The control signals are overlaid on a video signal 26 sent to the monitor 14 (FIG. 1), so as to provide directions (either text prompts or instructions or positioning marks) to the user of the system so that the user may "sing along" or otherwise perform in synchronization with the prerecorded signal, or exercise suitable control over the camera 8. The signal 26 may also be decoded to provide a camera control output, for example a zoom control signal. The mixer 12 typically also incorporates an audio effects and mixer unit 30 which receives and mixes inputs from an audio channel or channels 32 from the prerecording 2, inputs from an audio channel or channels 34 from a user microphone or microphones, and provides an output audio channel or channels at 36 to the monitor 14 and at 38 to the recorder 16.

Figure 3I:
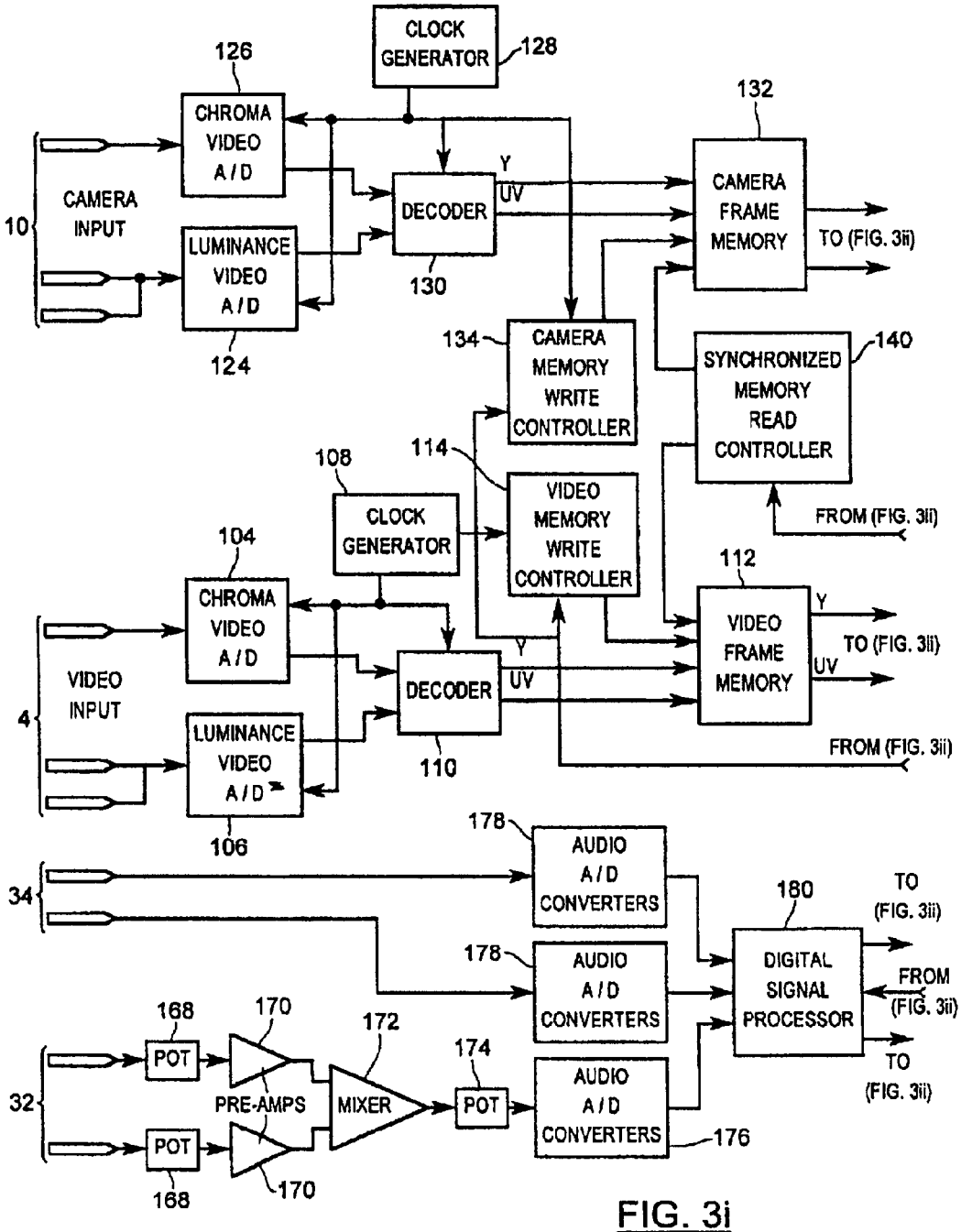
FIG. 3 is a more detailed block diagram of an exemplary mixer unit.
Figure 3I:
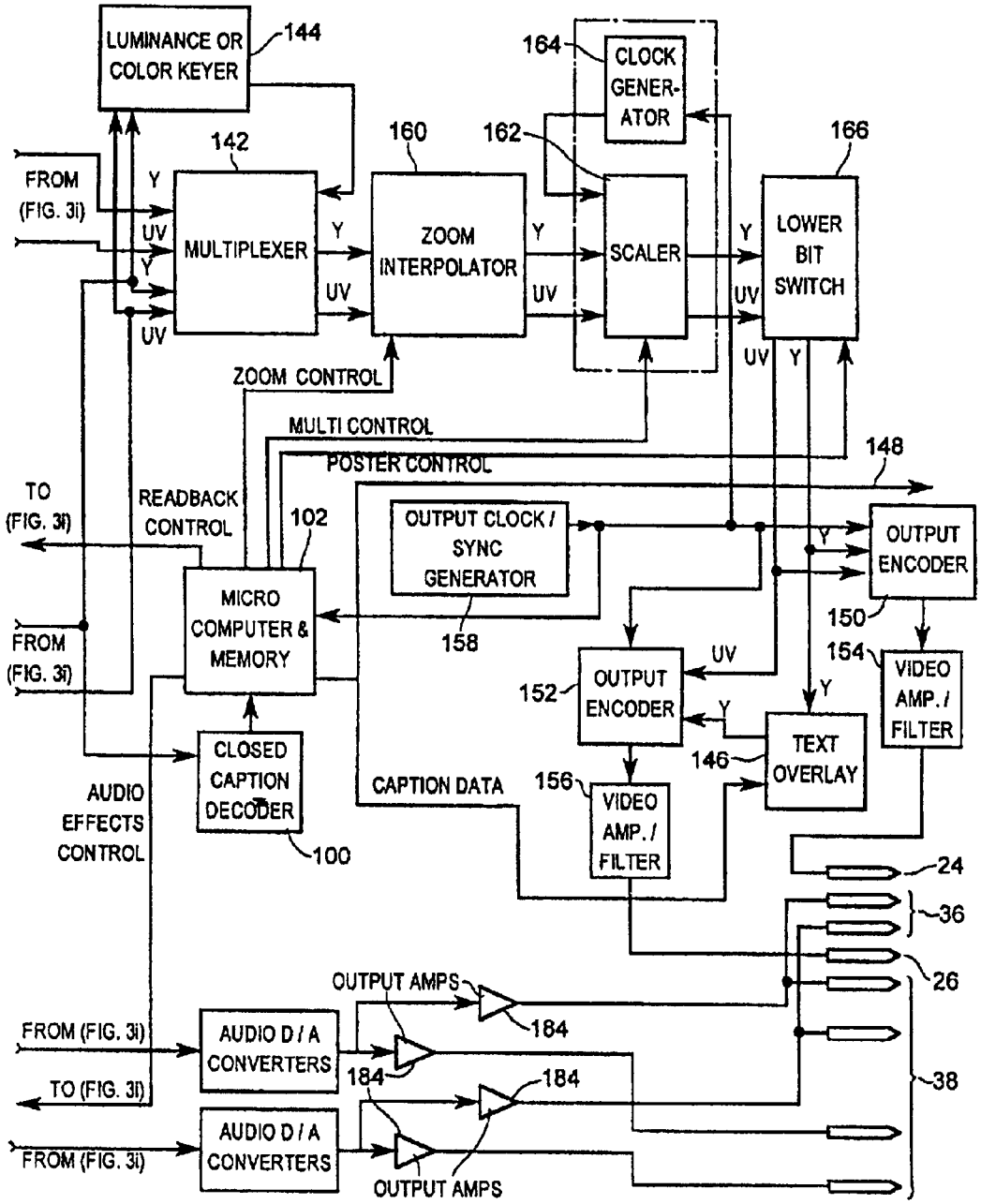

Referring now to FIG. 3, one version of the mixer 12 is shown in more detail. It should be understood that, in the main, the mixer 12 shown in FIG. 3 is similar to known digital video mixers incorporating chroma or luminance keying facilities except that it responds additionally to an additional prompt channel included in the prerecorded video input 4. Typically the closed caption channel, the data for which is encoded into certain lines of the video signal in the vertical interval outside of the normally displayed area, is used to convey prompt messages and control data to the system, and thus a closed caption decoder 100 is incorporated into the mixer 12 to recover this data. Such decoders are well understood in the art and need not be described further.

The mixer operates under control of a microcomputer 102 including appropriate working memory. An example of an suitable device is the 87C752 from Intel Corporation, and in general it controls the mixer in a manner similar to that of known video mixers. Accordingly, the mixer will be described primarily with a view to explaining how it differs from conventional digital video mixers, such as the MX-1 digital video mixer from Videonics (although it should be understood that many of the functions provided by such mixers are not essential to the present application and may be omitted to reduce costs), and so as to explain its relationship to the essential functions of the invention.

The video input 4 from the prerecorded source 2 may be either composite or S-video. In the latter case the video chroma and luminance signals are applied to separate analog to digital converters 104, 106 under control of a clock generator 108 which also controls a decoder 110 passing digital Y (luminance) and U and V (chrominance) signals to a frame memory 112 under control of a video memory write controller 114. If a composite video signal is provided, it is applied to the converter 106 and converter 104 is not used.

Similarly, the input 10 from the camera 8 is applied to A/D converters 124 and 126, or converter 124 only if a composite signal, under control of a clock generator 128 also controlling a decoder 130 passing signal to a memory 132 under control of controller 134.

A synchronized memory read controller 140 reads the contents of the memories 112 and 132 in synchronism under control of the microcomputer 102, the Y, U and V signals read from the memories being selected by a multiplexer 142, under control of a luminance or color keyer 144 itself controlled by signals read from the memory 112. When the selected keying signal, be it luminance or chroma, is present at a level denoting background, then the keyer causes the multiplexer 142 to pass at least part of the signals derived from input 10 and block at least part of the signals from input 4; otherwise it passes at least part of the signals derived from input 4 and blocks at least part of the signals derived from input 10. By this means signals from the camera input 10 are inserted into the keyed portions of the video input 4.

The Y (luminance) signal derived from the video input 4 is also passed to the closed caption decoder 100, which decodes the closed caption data in conventional manner to recover data contained therein and pass it to microcomputer 102 which interprets the data and either forwards it to a conventional overlay generator 146 and/or generates signals applied on a line 148 to control zooming (for example) of camera 8, and/or to the scalar 162 or interpolator 160 discussed below, if provided.

The Y, U and V signals from multiplexer 142 are passed to output encoders 150 and 152 under control of an output clock and synchronization separator 158, providing the video outputs 24 and 26 via amplifiers and filters 154 and 156, the V signal to encoder 152 being overlaid by text or video regenerated by the overlay generator 146 so that control instructions are passed to the user monitor 14.

The microcomputer 102 may control additional optional processing circuits between the multiplexer 142 and the encoders 150 and 152, these being of types known in digital video mixers; in this case there is shown a zoom interpolator 160, a scaler 162 controlled by a clock generator 164, and a lower bit switch 166. The zoom interpolator and scaler provide an electronic zoom effect which is preferred to optical zoom controlled by the line 48. The electronic zoom interpolator and scaler will act on the combined signal, and not just the local camera input as would an optical zoom. The lower bit switch 166 can be activated in known manner to provide a posterization effect. The interpolater 160 and scaler 162 may also be configured to be controlled manually by the user, since they act conjointly on the prerecorded and user provided signals.

Audio inputs 32 from local microphones are processed by potentiometer 168, preamplifiers 170, mixer 172, and a master potentiometer 174 before being applied to an A/D converter 176 while audio inputs associated with the prerecorded video signal are applied to A/D converters 278, the outputs from the A/D converters 176 and 178 being combined and optionally processed by a digital signal processor 180 in known manner under control of microcomputer 102. The processed digital audio signals are then passed through digital to analog converters 182 and preamplifiers 184 to the outputs 36 and 38.

The programming of microcomputer 102 has not been described, since except for any processing of the signals from the closed caption decoder 100, it is similar to that for known digital mixers. Processing by microcomputer 102 of closed caption data merely consist of intercepting data encoded on the closed option line 20 which provides control signals for passage by the microcomputer to the output 148 or the processing circuits 160, 162 and 166.

In use, the mixer 12 will operate much like a conventional digital video mixer, except that the keying function controlled by the keying signal in the input 4 is a default function, and control signals or messages in the closed caption field of the input 4 are decoded and output either as video overlays on the monitor 14 or as camera or mixer control signals.

It will therefore be appreciated that a users local generated video (and audio) signals may be combined with the video input from a prerecorded tape or disc to provide video and audio outputs in which user contributed images and sounds are combined with those on the prerecorded tape to provide a composite output in which prerecorded images are inserted into images provided by the user so that for example a famous singing star or animated cartoon character may appear to be performing together with a user in the user's own home or the user's choice of surroundings. The control or prompting channel, for example close captions appearing on the monitor 14, may provide on screen prompts to a user, which are invisible on the output passed to a recorder 16, either in the form of words, or indicators indicating how the user should place a locally generated image on the screen. This channel may also carry data which can be converted by the microcomputer 102 into data output on the line 148 in the form of camera control signals, for example to control of a zoom function of the camera 8. Unlike prior systems, the user does not need to perform against a blue screen or other means to generate keying of the user signal, since the keying is prerecorded into the prerecorded foreground signal. Such prerecorded, prekeyed signals have numerous potential applications of which those discussed above are merely exemplary.

I claim:

1. A system for video production, comprising a source of prerecorded video and audio signals from a prerecorded storage medium, a source of user supplied video and audio signals, a video and audio mixer for combining the prerecorded and user supplied signals to provide combined video and audio outputs, a production monitor connected to the mixer to display to the user the mixed signals, and a storage or reproduction device receiving a mixed video signal output from the mixer, wherein the prerecorded video signals from the prerecorded storage medium have a video signal content prekeyed with a keying signal to indicate areas within the prerecorded video signal to be replaced by the user supplied video signals, the mixer being operative to recognize the keying signal and substitute the user supplied video signal for those portions of said prerecorded video including said keying signal, and the mixer being operative to convert signals from the prompting channel into production control signals.

2. A system according to claim 1, wherein the control signals include user prompts displayed on the production monitor but absent from the combined video output.

3. A recording medium carrying a prerecorded video signal, prekeyed to define background of images defined by said video signal, which video signal, on playback by a user of the recording medium in apparatus configured to recognize the prekeyed background areas, will generate a signal into which may be inserted, at least in those background areas, a local signal provided by the user.

4. A recording medium according to claim 3, wherein the video signal prerecorded on the medium is predistorted by enhancing the brightness of at least the lowlights of the prerecorded signal outside said background areas while maintaining the background areas at or below black level.

5. A recording medium according to claim 3, wherein the recording medium further carries at least one audio channel, and at least one prompting channel including data translatable into instructions for control of the user provided video signal.

6. A recording medium according to claim 3, wherein the data in the prompting channel is translatable into video data optionally overlayable on video data from said video channel.

7. A system for generating video signals comprising prerecorded video signals overlaid on user provided video signals, comprising a recording medium carrying a prerecorded video signal, prekeyed to define background of images defined by said video signal, which video signal, on playback by a user of the recording medium in apparatus configured to recognize the prekeyed background areas, will generate a signal into which may be inserted, at least in those background areas, a local signal provided by the user, the video signal prerecorded on the medium being predistorted by enhancing the brightness of at least the lowlights of the prerecorded signal outside said background areas while maintaining the background areas at or below black level, and a mixer receiving video signals generated by playback of video signals from said recording medium and video signals from a user provided source, the mixer including means for enhancing the brightness of at least the lowlights of the user provided signal to a similar degree as the lowlight enhancement of the prerecorded signal, and a luminance keyer receiving said prerecorded signal and said lowlight enhanced user provided signal to produce an overlaid video signal in which the user signal is overlaid on the keyed portions of the prerecorded signal, and means for restoring the lowlights of the overlaid video signal to their original levels to provide an output signal.

*8. An apparatus configured to combine video signals from a plurality of video sources, comprising:*

*an input configured to receive a first video signal from a pre-recorded video source and configured to receive a second video signal from a second video source, the first video signal defining a foreground and including pre-keyed background portions;*

*a mixer coupled with the input and configured to replace the identified pre-keyed background portions of the first video source with the second video signal to generate a synchronized video signal; and*

*an output coupled with the mixer and configured to provide the synchronized video signal to an output device.*

*9. The apparatus of claim 8, wherein the second video source comprises a camera for capturing video images.*

*10. The apparatus of claim 9, wherein the second video signal is a live video signal from the camera for capturing video images.*

*11. The apparatus of claim 8, wherein the mixer further comprises a switcher configured to detect the pre-keyed background portions of the first video signal and configured to generate a combined video signal from non-keyed portions of the first video signal and the second video signal.*

*12. The apparatus of claim 11, wherein the mixer further comprises a time base control unit configured to receive the first video signal and the second video signal and configured to synchronize the first video signal and the second video signal.*

*13. The apparatus of claim 8, wherein the mixer further comprises a brightness enhancement circuit configured to enhance a brightness level of lowlights in the second video signal.*

*14. The apparatus of claim 8, wherein the first video signal comprises a prompting channel.*

*15. The apparatus of claim 14, wherein the prompting channel includes prompting signals.*

*16. The apparatus of claim 15, wherein the mixer further comprises a closed caption decoder configured to extract text from the prompting signal for display on the output device.*

*17. The apparatus of claim 15, wherein the mixer extracts the control signals from the prompting channel for controlling an external device coupled with the mixer.*

*18. The apparatus of claim 17, wherein the external device is the second video source.*

*19. The apparatus of claim 8, wherein the output device comprises one from a group consisting of a television and a video monitor.*

*20. The apparatus of claim 8, wherein the pre-keyed portions comprise one from a group consisting of chroma-keyed portions and luminance key portions.*

*21. The apparatus of claim 8, wherein the mixer is further configured to identify the pre-keyed background portions of the first video signal prior to replacement of the pre-keyed background portions.*

*22. The apparatus of claim 8, wherein the first video source comprises a pre-recorded storage medium.*

*23. The apparatus of claim 8, wherein the first video source comprises a tape for storing video.*

*24. The apparatus of claim 23, wherein the tape comprises a video tape.*

*25. The apparatus of claim 8, wherein the first video source comprises a disk for storing video.*

*26. The apparatus of claim 25, wherein the disk comprises a video disc.*

*27. The apparatus of claim 8, wherein the output devices comprise a device for recording video.*

*28. The apparatus of claim 27, wherein the device comprises a recorder.*

*29. The apparatus of claim 8, wherein the first video signal comprises one of a composite signal and an s-video signal.*

*30. A method for producing a combined video signal from a plurality of video signals from a plurality of video sources, comprising:*

*receiving a first video signal from a pre-recorded video source, the first video signal including a keying signal;*

*receiving a second video signal from second video source; and*

*replacing the keying signal with the second video signal to generate a video signal comprising portions of the first video signal and the second video signal.*

*31. The method for producing the combined video signal of claim 30, wherein the first video signal further comprises a prompting signal.*

*32. The method for producing the combined video signal of claim 31, wherein the prompting signal includes at least one from a group consisting of text, dimension indicators, and camera control signals.*

*33. The method for producing the combined video signal of claim 31, further comprising the step of generating screen prompts from the prompting signal.*

*34. The method for producing the combined video signal of claim 30, further comprising the step of extracting a control signal from the first video signal.*

*35. The method for producing the combined video signal of claim 34, wherein the control signal is adapted to control the second video source.*

*36. The method for producing the combined video signal of claim 30, wherein the keying signal comprises one from a group consisting of a chrominance signal, a luminance signal, and a color signal.*

*37. The method for producing the combined video signal of claim 30, wherein the step of replacing further comprises:*

*reading a luminance signal from the first video signal; and*

*blocking at least a portion of the first video signal and passing at least a portion of the second video signal in response to a value of the luminance signal being greater than or equal to a predetermined value.*

*38. The method for producing the combined video signal of claim 37, wherein the luminance signal of the first video signal further comprises a prompting signal and the method further comprising:*

*passing at least a portion of the luminance signal of the first video signal to a closed caption decoder; and*

*decoding the prompting signal to recover data therein.*

*39. The method for producing the combined video signal of claim 38, further comprising:*

*passing the data to a processing system; and*

*generating control signals from the data.*

*40. The method for producing the combined video signal of claim 30, wherein the step of replacing further comprises:*

*reading a luminance signal from the first video signal; and*

*passing at least a portion of the first video signal and passing at least a portion of the second video signal in response to a value of the luminance signal being greater than or equal to a predetermined value.*

*41. The method for producing the combined video signal of claim 30, further comprising:*

*reading a chrominance signal from the first video signal; and*

*blocking at least a portion of the first video signal and passing at least a portion of the second video signal in response to a value of the chrominance signal being greater than or equal to a predetermined value.*

*42. The method for producing the combined video signal of claim 30, further comprising:*

*reading a chrominance signal from the first video signal; and*

*passing at least a portion of the first video signal and blocking at least a portion of the second video signal in response to a value of the chrominance signal being less than or equal to the predetermined value.*

*43. The method for producing the combined video signal of claim 42, wherein the chrominance signal of the first video signal further comprises a prompting signal and the method further comprising:*

*passing at least a portion of the chrominance signal of the first video signal to a closed caption decoder; and*

*decoding the prompting signal to recover data therein.*

*44. The method for producing the combined video signal of claim 43, further comprising:*

*passing the data to a processing system; and*

*generating control signals from the data.*

*45. The method for producing the combined video signal of claim 30, further comprising identifying the keying signal in the first video signal prior to replacing the keying signal.*

*46. A method of producing a video recording having a first video signal for use with mixing with another video signal, the method comprising:*

*capturing on a storage medium the first video signal from a first video source;*

*identifying a portion of the first video signal for later overlay by a portion of an unkeyed second video signal from a second video source;*

*keying the identified portion of the first video signal; and*

*recording the captured and keyed first video signal on a recording medium.*

*47. The method for producing the video recording of claim 46, wherein the video signal includes a prompting channel.*

*48. The method of producing the video recording of claim 47, further comprising providing a prompting signal in the prompting channel for providing one from a group comprising on-screen text prompts and control signals.*

*49. The method for producing the video recording of claim 41, wherein the second video source is a camera configured to capture video signals.*

*50. The method for producing the video recording of claim 49, wherein the camera configured to capture video signals captures live video signals.*

*51. The apparatus of claim 46, wherein the recording medium comprises a recorder.*

*52. The method of producing the video recording of claim 46, wherein the first video signal comprises entertainment related video content.*

*53. A video playback device configured to provide video signals comprising a portion of a first video signal and a portion of a second video signal, the video playback device comprising:*

*a playback mechanism configured to play a pre-recorded video medium, the pre-recorded medium further comprising a pre-recorded video signal including a pre-keyed portion; and*

*a mixer coupled with the playback mechanism and configured to identify the pre-keyed portion of the pre-recorded video signal and configured to receive a second video signal from a video source, and configured to replace either the pre-keyed portion or a non-pre-keyed portion of the pre-recorded video signal with the second video signal to generate an output video signal.*

*54. The video playback device of claim 53, further comprising an external port configured to couple with an external device for transmitting the output video signal.*

*55. The video playback device of claim 54, wherein the external port couples with a device for recording video.*

*56. The video playback device of claim 55, wherein the device for recording video comprises a recorder.*

*57. The apparatus of claim 53, wherein the video source comprises a camera for capturing video signals.*

*58. The apparatus of claim 57, wherein the second video signal from the camera for capturing video signals comprises a live video signal.*

*59. The apparatus of claim 53, wherein the mixer further comprises a switcher configured to detect the pre-keyed portions of the pre-recorded video signal.*

*60. The apparatus of claim 59, wherein the mixer further comprises a brightness enhancement circuit configured to enhance a brightness level of lowlights in the second video signal.*

*61. The apparatus of claim 59, wherein the pre-recorded video signal further comprises a prompting channel.*

*62. The apparatus of claim 61, wherein the prompting channel includes prompting signals.*

*63. The apparatus of claim 61, wherein the mixer further comprises a closed caption decoder configured to extract text from the prompting channel for display on an external device.*

*64. The apparatus of claim 61, wherein the mixer extracts control signals from the prompting channel for controlling an external device coupled with the mixer.*

*65. The video playback device of claim 64, wherein the external device comprises a device for displaying video images.*

*66. The apparatus of claim 59, wherein the mixer further comprises a time base control unit configured to receive the pre-recorded video signal and the second video signal and configured to synchronize the pre-recorded video signal and the second video signal.*

*67. The apparatus of claim 53, wherein the pre-keyed portions of the pre-recorded video signal comprise one from a group consisting of chroma-key portions and luminance key portions.*

*68. The apparatus of claim 53, wherein the pre-recorded medium comprises a video source connected through a communications network.*

*69. The video playback device of claim 53, wherein the pre-recorded medium comprises a tape.*

*70. The video playback device of claim 69, wherein the tape comprises a video tape.*

*71. The video playback device of claim 53, wherein the pre-recorded medium comprises a disk.*

*72. The video playback device of claim 71, wherein the disk comprises a video disc.*

*73. The video playback device of claim 53, wherein the external port couples with a device for recording video.*

*74. The video playback device of claim 53, wherein the external device comprises a device for viewing video images.*

*75. The video playback device of claim 53, wherein the external device comprises a device for recording video signals.*

*76. An apparatus configured to combine video signals from a plurality of video sources, comprising:*

*an input configured to receive a first video signal from a pre-recorded video source and configured to receive a second video signal from a second video source, the first video signal including a keyed portion and a non-keyed portion;*

*a mixer coupled with the input and configured to replace either the keyed portion or the non-keyed portion with the second video signal to generate a synchronized video signal; and*

*an output coupled with the mixer and configured to provide the synchronized video signal for an output device.*

*77. The apparatus of claim 76, wherein the keyed portion is a background portion and the non-keyed portion is a foreground portion of the first video signal.*

*78. The apparatus of claim 76, wherein the non-keyed portion is a background portion and the keyed portion is a foreground portion of the video signal.*

*79. The apparatus of claim 76, wherein the second video source comprises a camera for capturing video.*

*80. The apparatus of claim 79, wherein the second video signal comprises a live video signal from the camera for capturing video.*

*81. The apparatus of claim 76, wherein the mixer further comprises a switcher configured to detect the non-keyed portion of the first video signal and configured to generate the synchronized video signal from the non-keyed portions of the first video signal and the second video signal.*

*82. The apparatus of claim 76, wherein the mixer further comprises a switcher configured to detect the keyed portion of the first video signal and configured to generate the synchronized video signal from the keyed portions of the first video signal and the second video signal.*

*83. The apparatus of claim 76, wherein the mixer further comprises a brightness enhancement circuit configured to enhance a brightness level of lowlights in the second video signal.*

*84. The apparatus of claim 76, wherein the mixer further comprises a time base control unit configured to receive the first video signal and the second video signal to synchronize the first video signal and the second video signal.*

*85. The apparatus of claim 76, wherein the first video signal further comprises a prompting channel.*

*86. The apparatus of claim 85, wherein the prompting channel includes prompting signals.*

*87. The apparatus of claim 86, wherein the mixer further comprises a closed caption decoder configured to extract text from the prompting signal for display on the output device.*

*88. The apparatus of claim 85, wherein the mixer extracts the control signals from the prompting channel for controlling an external device coupled with the mixer.*

*89. The apparatus of claim 88, wherein the external device comprises a device for displaying video images.*

*90. The apparatus of claim 76, wherein the keyed portion of the first video signal comprises a chroma-key portion.*

*91. The apparatus of claim 76, wherein the keyed portion of the first video signal comprises a luminance key portion.*

*92. The apparatus of claim 76, wherein the non-keyed portion of the first video signal comprises a chroma-key portion.*

*93. The apparatus of claim 76, wherein the non-keyed portion of the first video signal comprises a luminance key portion.*

*94. The video playback device of claim 76, wherein the external port couples with a device for recording video.*

*95. The apparatus of claim 76, wherein the output device comprises a device for displaying video images.*

*96. The apparatus of claim 76, wherein the first video source comprises a medium for storing recorded images.*

*97. The apparatus of claim 96, wherein the medium comprises a tape or a disk.*

*98. A method for combining video signals from a plurality of video signal sources, comprising:*

*receiving a first video signal from a pre-recorded video source, the first video signal further comprising a keyed portion and a non-keyed portion;*

*receiving a second video signal from second video source; and*

*replacing either the keyed portion or the non-keyed portion of the first video signal with the second video signal to generate a third video signal comprising portions of the first video signal and the second video signal.*

*99. The method for combining video signals of claim 98, wherein the first video signal further comprises a prompting signal.*

*100. The method for combining video signals of claim 99, wherein the prompting signal includes at least one from a group consisting of text, dimension indicators, and camera control signals.*

*101. The method for combining video signals of claim 99, further comprising the step of generating screen prompts from the prompting signal.*

*102. The method for combining video signals of claim 98, further comprising the step of extracting a control signal from the first video signal.*

*103. The method for combining video signals of claim 102, wherein the control signal is adapted to control the second video source.*

*104. The method for combining video signals of claim 98, wherein the keyed portion of the first video signal comprises a background portion.*

*105. The method for combining video signals of claim 98, wherein the non-keyed portion of the first video signal comprises a background portion.*

*106. The method for combining video signals of claim 98, wherein the keyed portion of the first video signal comprises a foreground portion.*

*107. The method for combining video signals of claim 98, wherein the non-keyed portion of the first video signal comprises a foreground portion.*

*108. The method for combining video signals of claim 98, wherein the keyed portion of the first video signal is a chrominance signal.*

*109. The method for combining video signals of claim 98, wherein the non-keyed portion of the first video signal is a chrominance signal.*

*110. The method for combining video signals of claim 98, wherein the keyed portion of the first video signal is a luminance signal.*

*111. The method for combining video signals of claim 98, wherein the non-keyed portion of the first video signal is a luminance signal.*

*112. The method for combining video signals of claim 98, further comprising:*

*reading a luminance signal from the first video signal; and*

*blocking at least a portion of the first video signal and passing at least a portion of the second video signal in response to a value of the luminance signal being greater than or equal to a predetermined value.*

*113. The method for combining video signals of claim 112, wherein the luminance signal of the first video signal further comprises a prompting signal and the method further comprising:*

*passing at least a portion of the luminance signal of the first video signal to a closed caption decoder; and*

*decoding the prompting signal to recover data therein.*

*114. The method for combining video signals of claim 113, further comprising:*

*passing the data to a processing system; and*

*generating control signals from the data.*

*115. The method for combining video signals of claim 98, further comprising:*

*reading a chrominance signal from the first video signal; and*

*blocking at least a portion of the first video signal and passing at least a portion of the second video signal in response to a value of the chrominance signal being greater than or equal to a predetermined value.*

*116. The method for combining video signals of claim 115, wherein the chrominance signal of the first video signal further comprises a prompting signal and the method further comprising:*

*passing at least a portion of the chrominance signal of the first video signal to a closed caption decoder; and*

*decoding the prompting signal to recover data therein.*

*117. The method for combining video signals of claim 116, further comprising:*

*passing the data to a processing system; and*

*generating control signals from the data.*

*118. The method for combining video signals of claim 98, wherein the second video source comprises a video camera.*

*119. The method for combining video signals of claim 98, wherein the third video signal comprises an output video signal.*

*120. The method for combining video signals of claim 119, further comprising supplying the output video signal to an output device.*

*121. The method for combining video signals of claim 120, wherein the output device comprises one from a group of a visual display device and a data signal storage device.*

*122. The method for combining video signals of claim 98, wherein the first video source comprises a computing device connected through a communications network.*

*123. The method of claim 98, wherein the first video source comprises a medium for storing recorded images.*

*124. The apparatus of claim 123, wherein the medium comprises a tape or a disk.*

*125. An apparatus configured to generate a synchronized video signal from a plurality of video signals, comprising:*

*an input means for receiving a first video signal from a means for storing and for receiving a second video signal from a means for capturing video, the first video signal including a keyed portion and a non-keyed portion;*

*a mixing means coupled with the input means for replacing either the keyed portion or the non-keyed portion with the second video signal and for generating a synchronized video signal; and*

*an output means coupled with the mixing means for outputting the synchronized video signal to an output device.*

*126. The apparatus of claim 125, wherein the keyed portion is a background portion and the non-keyed portion is a foreground portion of the first video signal.*

*127. The apparatus of claim 125, wherein the non-keyed portion is a background portion and the keyed portion is a foreground portion of the video signal.*

*128. The apparatus of claim 125, wherein the means for capturing video comprises a second video source.*

*129. The apparatus of claim 128, wherein the second video signal comprises a live video signal from the second video source.*

*130. The apparatus of claim 125, wherein the means for mixing further comprises a means for detecting the non-keyed portion of the first video signal and a means for generating the synchronized video signal from the non-keyed portions of the first video signal and the second video signal.*

*131. The apparatus of claim 125, wherein the means for mixing further comprises means for detecting the keyed portion of the first video signal and a means for generating the synchronized video signal from the keyed portions of the first video signal and the second video signal.*

*132. The apparatus of claim 125, wherein the means for mixing further comprises a means for enhancing a brightness level of lowlights in the second video signal.*

*133. The apparatus of claim 125, wherein the first video signal further comprises a prompting channel.*

*134. The apparatus of claim 133, wherein the prompting channel includes prompting signals.*

*135. The apparatus of claim 134, wherein the means for mixing further comprises a means for extracting text from the prompting signal for display on the output device.*

*136. The apparatus of claim 133, wherein the means for mixing further comprises a means for extracting the control signals from the prompting channel for controlling an external device.*

*137. The apparatus of claim 125, wherein the keyed portion of the first video signal comprises a chroma-key portion.*

*138. The apparatus of claim 125, wherein the keyed portion of the first video signal comprises a luminance key portion.*

*139. The apparatus of claim 125, wherein the non-keyed portion of the first video signal comprises a chroma-key portion.*

*140. The apparatus of claim 125, wherein the non-keyed portion of the first video signal comprises a luminance key portion.*

*141. The apparatus of claim 125, wherein the means for mixing comprises a mixer.*

*142. The video playback device of claim 125, wherein the external port couples with a device for recording video.*

*143. The apparatus of claim 125, wherein the output device comprises a device for displaying video images.*

*144. The apparatus of claim 125, wherein the output device comprises a device for recording video signals.*

*145. The apparatus of claim 125, wherein the first video source comprises a medium for storing recorded images.*

*146. The apparatus of claim 145, wherein the medium comprises a tape or a disk.*

* * * * *